Feb. 7, 1950 P. B. RICHARDSON 2,497,015
WEIGHING MACHINE
Filed Nov. 19, 1948 3 Sheets-Sheet 1

Inventor
Philip B. Richardson,
By Morris & Patterson
ATTORNEYS

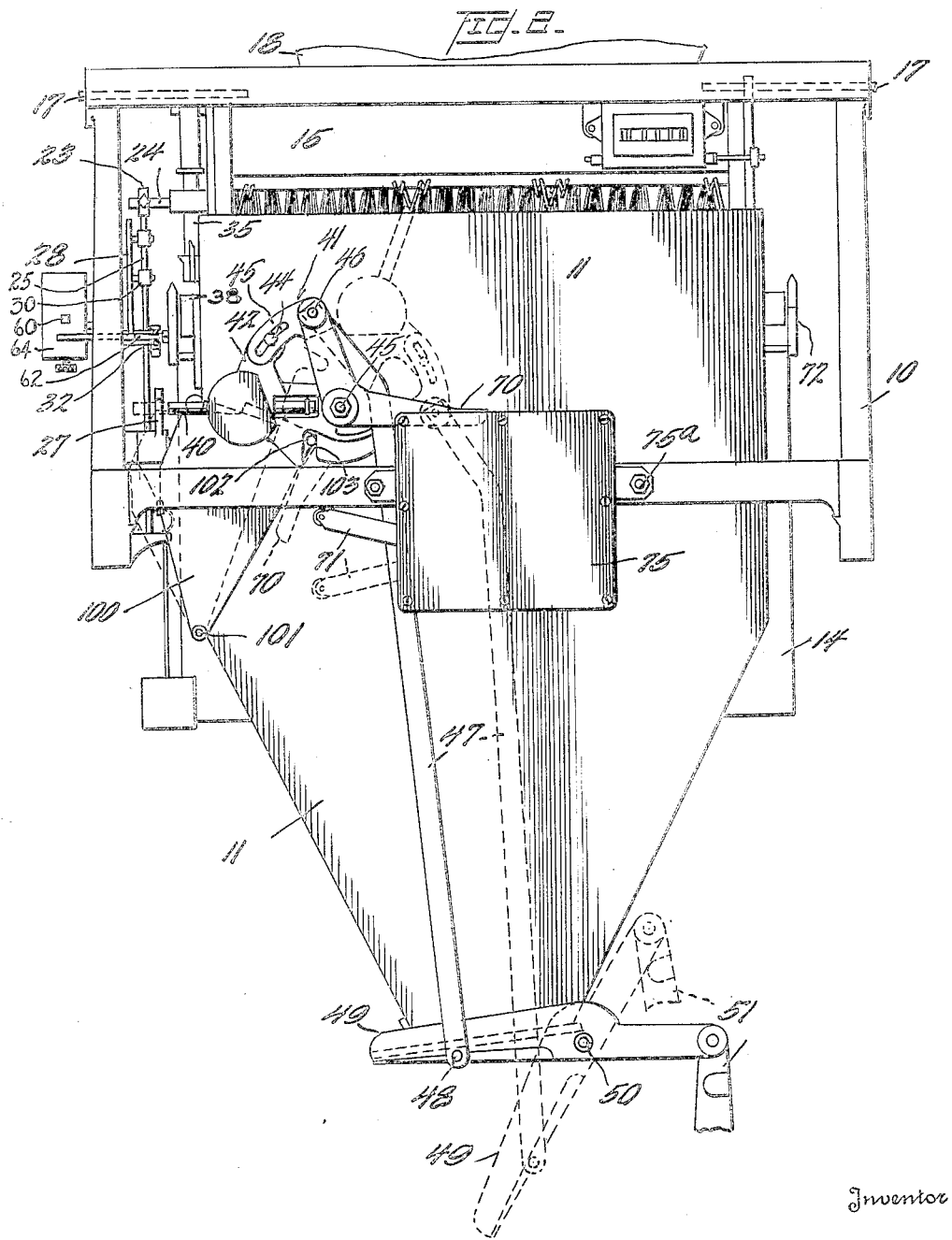

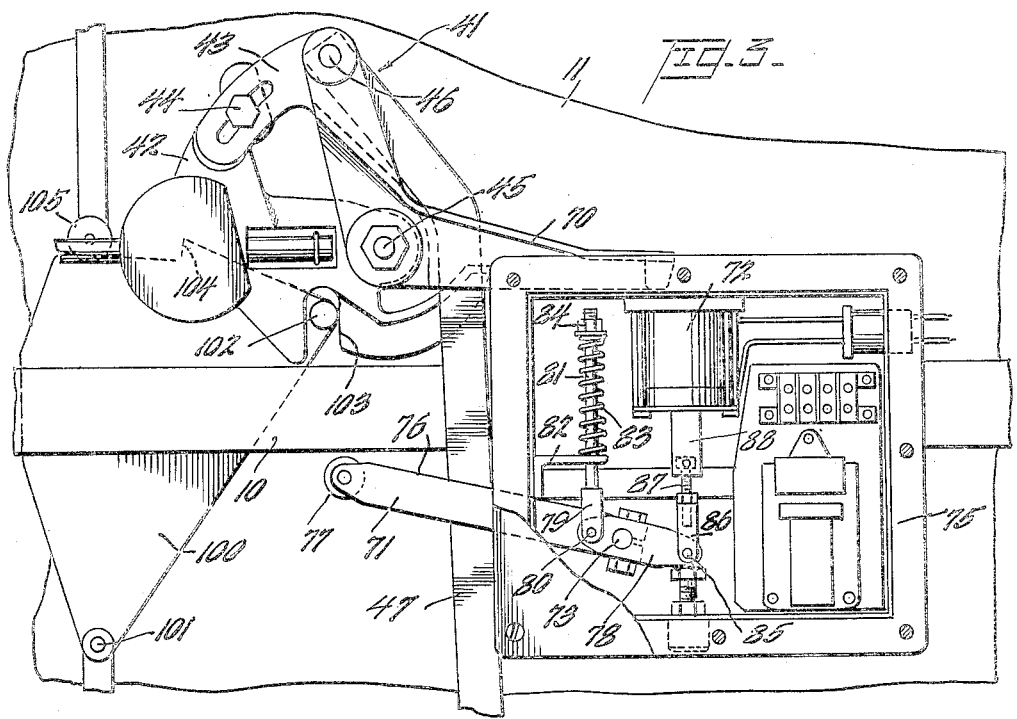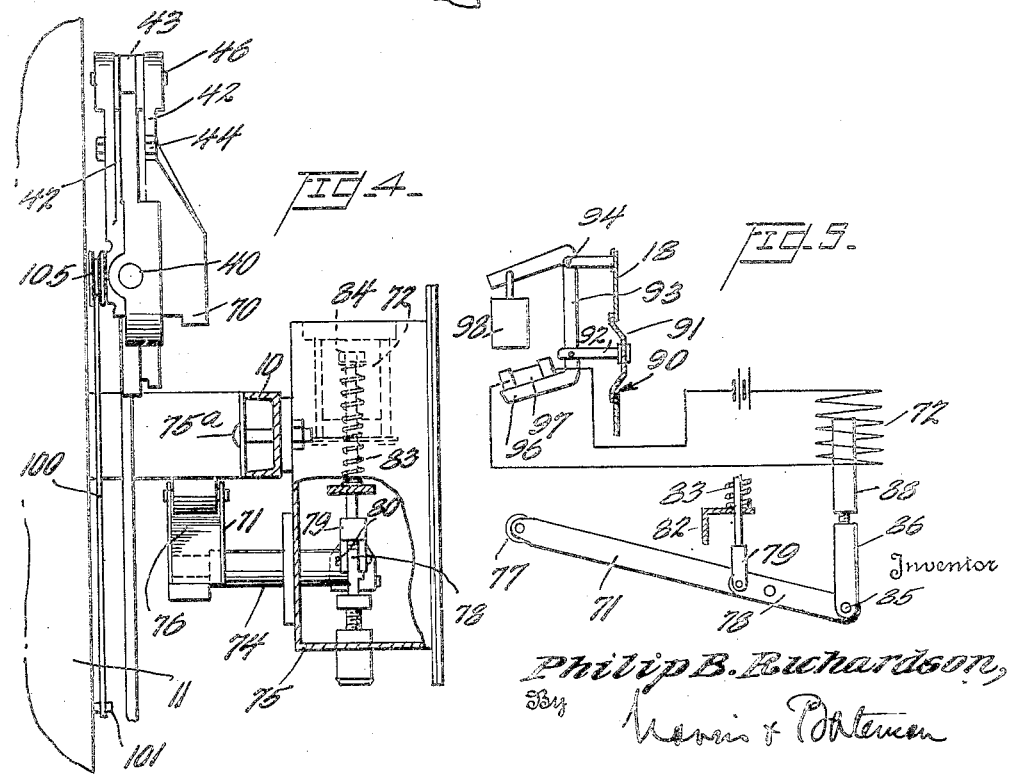

Patented Feb. 7, 1950

2,497,015

UNITED STATES PATENT OFFICE 2,497,015

WEIGHING MACHINE

Philip B. Richardson, Montclair, N. J., assignor to Richardson Scale Company, Clifton, N. J., a corporation of New Jersey Application November 19, 1948, Serial No. 61,019

1 Claim. (Cl. 249—50)

The present invention relates to improvements in weighing machines, and more especially to those of the automatic type wherein the discharge of each weighing from the weigh hopper and the initiation of the feed for the next weighing are effected automatically, completion of the weighing being effected by a dribble stream, and the weight of the falling column of material during the dribble being compensated for to thereby ensure accuracy in each weighing.

The primary object of the invention is to provide locking means for preventing the weighing machine from making a succeeding weighing unless there is a sufficient amount of material in the supply for the feeding of a full weigh to the weigh hopper, and more particularly, to prevent the machine from making another weighing until at least one weighing of material has been accumulated in the supply bin ahead of the weighing machine, thereby avoiding inaccuracy in the weighing due to the supply of material running short, especially during the dribble at the end of a weighing.

To these and other ends, the invention consists in certain improvements and combinations and arrangements of parts, all as will be hereinafter more fully described, the features of novelty being pointed out more particularly in the claim at the end of this specification.

In the accompanying drawings:

Figure 2 is an end elevation on the same scale, of part of the machine shown in Fig. 1 as viewed from the right in said figure.

Fig. 3 is a detail elevation on an enlarged scale of the locking means and the cooperating parts of the weighing machine.

Fig. 4 is an elevation of the structure shown in Fig. 3 as viewed from the left in said figure.

Fig. 5 is an electrical diagram of the circuit connecting the parts of the locking means.

Similar parts are designated by the same reference characters in the different views.

Figure 1:
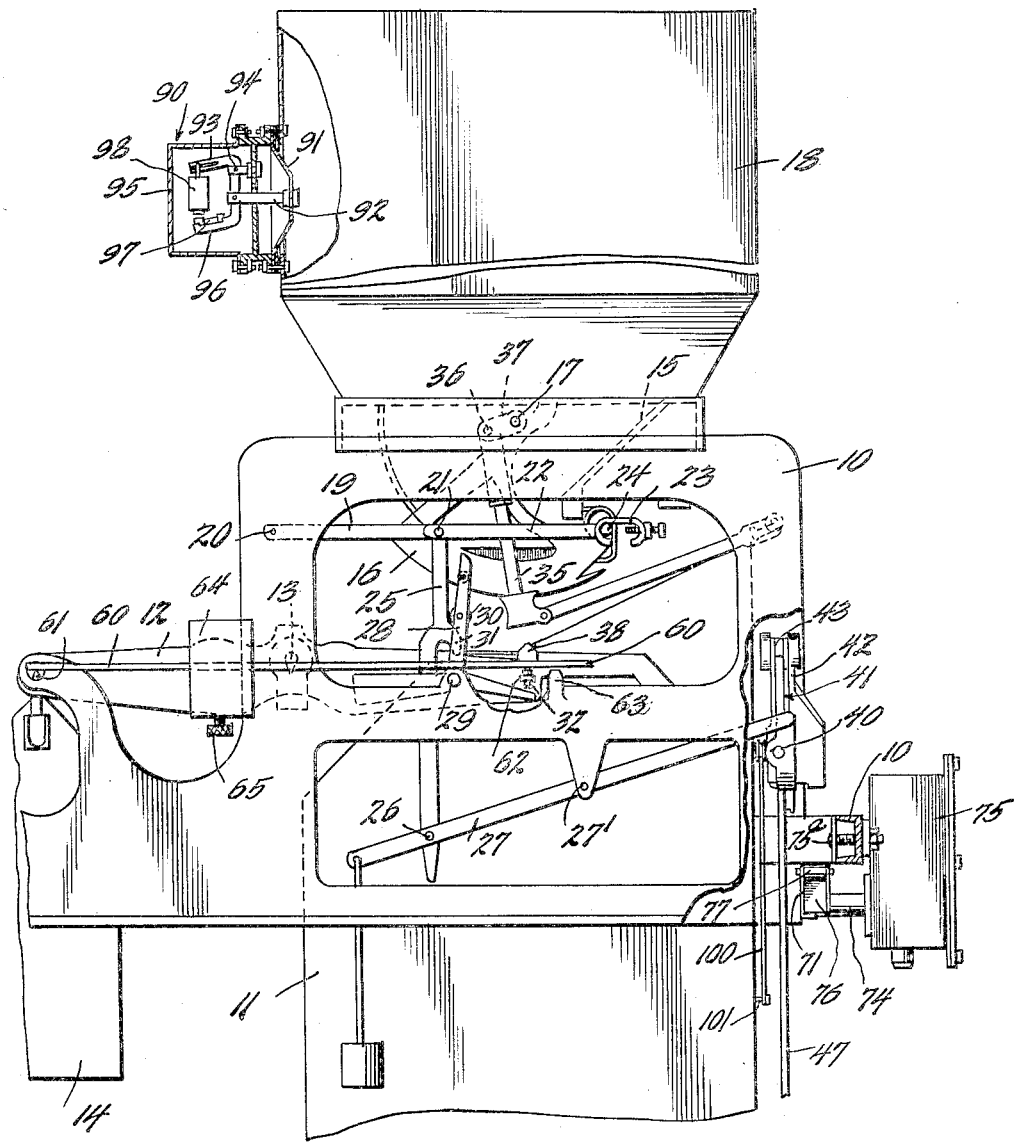
Figure 1 is a front elevation of an automatic weighing machine embodying the present invention.

The invention is applicable generally to weighing machines of the automatic type, it being shown for example, as applied to an automatic weighing machine of the type shown and described in United States Patent No. 962,919, granted June 28, 1910, to which reference may be had for a detailed description of the construction and operation of such a machine. For the purposes of the present invention, it is believed sufficient to describe such a machine generally as comprising a main frame 10 which supports the various elements of the machine, the machine comprising a weigh hopper 11 which is suspended from the end of a weigh beam 12 fulcrumed intermediately of its ends on knife edges 13 fixed to the frame and counterbalanced at its other end by a weight box 14. The top of the weigh hopper is open, and above it is mounted a feed hopper 15 having a feed gate 16 which is pivoted at 17 to swing into open and closed positions to feed and cut off the feed of material to the hopper. The feed hopper 15 is below and receives the material to be weighed from a bin or equivalent supply means 18, to which the material is usually conducted from above by a bucket elevator.

The feed gate is provided with a toggle comprising a link 19 pivotally connected at one end as at 20 with the frame and is pivotally connected by the pivot 21 at its other end to one end of another toggle link 22, the other end of the latter link being provided with a yoke 23 in which operates a pin 24 fixed to the feed gate. While the links of this toggle are straightened, the feed gate is locked in closed position. The central pivot 21 of the toggle is pivotally connected to a drop bar 25 the lower portion of which is pivotally connected at 26 to a knock-off lever 27, the latter being pivoted at 27' to the frame and it extends beyond the end of the frame. The drop bar 25 is controlled by a trigger 28 which is pivoted on the frame at 29 and has a roller 30 thereon on which a shoulder 31 on the drop bar is adapted to rest while the drop bar is in its raised position and holds the toggle in its upwardly flexed condition, thereby holding the feed gate open during the feeding of the dribble stream of material, the weigh beam having a screw 32 thereon which engages and trips the trigger when the weigh beam assumes a balance condition and thereby permits complete closing of the feed gate and locking of the feed gate in closed position by the toggle.

The feed gate is opened after the discharge of each weighing from the weigh hopper by a pendant 35 which is pivotally connected at 36 to an arm 37 connected to the feed gate, the lower end of this pendant being engageable by a projection 38 on the weigh-hopper end of the weigh beam as this end of the weigh beam rises after the discharge of a weighing from the weigh hopper, and the pendant holds the feed gate open for the feed of the main stream of material to the weigh hopper but descends and thus permits the feed gate to move toward closed position as the weigh hopper descends, thus reducing the stream of material flowing to the weigh hopper to a dribble stream, the feed gate being held in the dribble position by the trigger 28 until the latter is tripped by the weigh beam as it comes to balance.

The bar 25 drops when released by tripping of the trigger, thus closing the feed gate completely and cutting off the dribble stream in doing so, and the dropping of this bar swings upwardly the outer end of the lever 27 to which it is connected. The outer end of the lever 27 during the feeding of material to the weigh hopper, is below pin 40 slidably mounted in a weight toggle 41, this pin being assumed to be retracted in Figs. 1 and 2 which show the machine in a condition of rest, but the pin is extended from the weight toggle, after the outer end of the lever 27 has been depressed in order to start the machine into operation, during which the lever 27 will be in a position to engage the under side of the pin 40. The weight toggle 41 which, in the present instance comprises two coaxial members 42 and 43 which are relatively adjustable angularly and clamped in adjusted relation by a bolt 44, is pivoted on a pivot pin 45 secured in the side of the weigh hopper. The weight toggle is pivotally connected at 46 to a link 47, the lower end of which is pivotally connected at 48 to the weigh hopper discharge door 49, the latter being pivoted to the lower end of the weigh hopper at 50 and having a counterweight 51 thereon which acts to close this door after a weighing of material has been discharged from the weigh hopper. The pivot 46 is slightly beyond dead center position above the pivot 45 while the weight toggle is in a position to hold the hopper discharge door in closed position, as shown by the full lines in Fig. 2, but when the outer end of the lever 27 swings upwardly incident to the complete closing of the feed gate, it strikes the under side of the pin 40 on the weight toggle and thereby swings it upwardly over its dead center, and the weight of material in the hopper completes the swing of the weight toggle and the hopper discharge door into the dotted line position shown in Fig. 2, thereby effecting discharge of the weighing from the weigh hopper.

After a weighing of material has been discharged from the weigh hopper, the counterweight 51 on the hopper discharge door closes this door and in doing so, returns the weight toggle to the position shown by the full lines in Fig. 2. As the weight toggle assumes this position, the pin 40 thereon strikes the outer end of the lever 27 and swings it downwardly about its pivot 27′ in a direction to lift the bar 25, and this bar then flexes the toggle 19, 22 and thereby unlocks the feed gate for the feeding of the next weighing to the weigh hopper.

Suitable means is provided to compensate for the weight of the column of material in the act of falling at the moment the feed gate closes and thus cuts off the dribble feed. The compensating means shown for example in the present instance comprises a bar 60 one end of which rests on a knife edge 61 which is on the frame in alinement with the pivotal connection of the weight box 14 with the weigh beam, and the other end of this bar rests on a projection 62 on the weigh hopper end of the weigh beam while the weigh hopper is raised or above its balance position, and when the weigh beam comes to balance, this end of this bar comes to rest on a projection 63 on the frame, thus removing its influence on the weigh beam. The bar 60 is provided with a weight 64 between its ends which is adjustable along the bar to add weight to the weigh hopper end of the weigh beam equal to the weight of the column of material in the dribble stream in the act of falling at the moment the feed gate closes and thus cuts off the dribble stream, and the weight 64 is provided with a screw 65 for securing it in adjusted position along the compensating bar 60.

Means is also preferably employed for preventing unlocking and opening of the feed gate until after the hopper discharge door has closed, thus preventing material from passing through the machine without being weighed, such means as shown in the present instance comprising a plate 100 which is pivoted at its lower end on the weigh hopper at 101 and having a pin 102 fixed thereon in a position to operate in a slot 103 formed in the weight toggle member 42 so that as the weight toggle swings into the dotted line position shown in Fig. 2, incident to opening of the hopper discharge door, this plate will be swung outwardly into the path of descent of the outer end of the lever 27 and thereby prevent movement of this lever in a direction to unlock the feed gate 16, but when the weight toggle returns to the full line position shown in Fig. 2 incident to closing of the hopper discharge door, this plate will be withdrawn from the path of the lever 27 and the latter may then operate to unlock the feed gate. Similarly, when lever 27 is down and gate 16 open, plate 100 prevents the weight toggle being swung into the dotted position (Fig. 2) because plate 100 would engage lever 27. The plate 100 is so designed that its left hand edge clears the lever 27 while a weighing is being made, but the clearance is so slight that plate 100 would bind against the lever 27 before the toggle through points 46, 45 and 48 could be broken. The outward swing of this plate is limited by a shoulder 104 on its upper edge which is engageable with a roller 105 mounted on the hopper, this roller being preferably grooved to serve as a guide for the plate during its swinging movements.

The present invention provides locking means for preventing another weighing after a weighing has been made if the supply of material available for the machine is insufficient for a complete weighing. As applied to a weighing machine of the type hereinbefore described, such locking means locks the weight toggle 41 from returning to the position which actuates the lever 27 to unlock the feed gate 16, thereby preventing opening of this gate and commencement of another weighing. The locking means as shown in the present instance comprises a tail 70 which is fixed to and forms a part of the weight toggle member 43, a locking lever 71 to cooperate with this tail, and a solenoid 72 which controls the locking lever and in turn is controlled by means which is responsive to the amount of material available for supply to the weighing machine. The lever 71 is fixed to a shaft 73 mounted rotatably in a bearing 74 supported by a casing 75 which is fixed to the frame of the machine, as by bolts 75a, the lever 71 comprising preferably a channel-shaped member the upper side of which is closed by a wall 76, and this lever has a roller 77 journalled in its end between its side walls. The shaft to which the lever 71 is fixed has a shorter lever 78 fixed thereto, this lever having a yoke 79 pivotally connected thereto at one end as at 80, this yoke carrying a rod 81 which is slidable through an angle bracket 82 fixed to a wall of the casing 75 and is provided with a compression spring 83 which is interposed between the bracket 82 and an adjusting nut 84 threaded on the rod, this spring acting to bias the roller carrying end of the lever 71 toward its upper position as shown by the full lines in Fig. 2 and as shown in Fig. 3. The lever 78 is pivotally connected at its other end as at 85 to a yoke 86, the latter being connected by an adjusting link 87 pivoted to the core 88 of the solenoid 72. The weight of the core of the solenoid assists the action of the spring 83 in bringing the roller carrying end of the lever 71 to the raised position as shown in Fig. 3 and in yieldingly holding it in that position.

The solenoid 72 is controlled by means which is responsive to the amount of material available for feeding to the weighing machine. Different devices may be employed for this purpose, that shown in the present instance being of the type shown and described in United States Letters Patent No. 1,951,980, granted March 20, 1934, to which reference may be had for a detailed description of its construction and mode of operation. This device, designated generally at 90, is mounted in one of the side walls of bin 18 which supplies the material to the weighing machine to be weighed. For the purposes of the present invention, the device may be described briefly as comprising a flexible diaphragm 91 the peripheral edge of which is secured around the edge of an opening in the side wall of the bin so that it will be subject to the pressure of the head of material contained in the bin. The diaphragm is connected by a rod 92 to a lever 93 which is pivoted at 94 on a bracket fixed in the casing 95 of the device, the lever 93 having an arm 96 extending therefrom and carrying a mercury switch 97 which is in open circuit condition while the diaphragm 91 is flexed inwardly under the influence of a weight 98 due to lack of a sufficient quantity of material in the bin but will be swung by the lever 93 into closed circuit condition when the diaphragm is pressed outwardly by the pressure of a sufficient amount of material in the bin. The contacts or electrodes of the mercury switch are connected in series with the solenoid 72 as for example as shown in Fig. 5. Accordingly, while the diaphragm occupies its inwardly flexed position, due to an insufficient supply of material in the bin, the mercury switch is in open circuit condition, and the solenoid 72 will be deenergized, and while the diaphragm is pressed outwardly by the pressure of a sufficient amount of material in the bin, the switch 97 will be in closed circuit condition and the solenoid 72 will be energized.

The operation of a weighing machine constructed as hereinbefore described and embodying locking means provided by the present invention for preventing the machine from making another weighing unless there is a sufficient amount of material in the supply for the feeding of a full weighing to the weigh hopper, is as follows: Assuming that the bin 18 contains a sufficient amount of material for the feeding of a full weighing to the weigh hopper, and that the preceding weighing has been discharged from the weigh hopper, the diaphragm 91 will be pressed outwardly under the pressure of the material in the bin and the mercury switch 97 will be in closed circuit condition, thus energizing the solenoid 72 with which it is connected in series, thus holding the roller carrying end of the lever 71 in its lowered position, as shown by the dotted lines in Fig. 2. While the lever 71 is in this position, the roller 77 thereon will be clear of the path of the tail 70 on the weight toggle 42 so that the latter may swing back without obstruction by this lever from its dotted line position to its full line position shown in Fig. 2, and the pin 40 on the weight toggle will strike the outer end of the lever 27, thereby swinging its inner end upwardly, carrying with it the drop bar 25, the latter in its upward movement flexing the toggle 19, 20 upwardly, thereby unlocking the feed gate 16 and permitting the projection 38 on the weigh hopper end of the weigh beam, which rises due to the discharge of the previous weighing from the weigh hopper, to push the pendant 35 upwardly, thereby opening the feed gate 16 sufficiently for the flow of the main stream of material from the feed hopper into the weigh hopper. When an approximately full weighing has been fed by the main stream to the weigh hopper, the weigh hopper end of the weigh beam descends under the weight of the load therein and of the feed gate and pendant 35 but the drop bar 25 will come to rest on trigger 28 which will hold the toggle 19, 20 in upwardly flexed condition, the pin 24 on the feed gate then preventing complete closing of the feed gate and permitting a dribble stream of material to flow into the weigh hopper until the weigh beam comes to balance. As the weigh beam comes to balance, the projection 32 thereon trips the trigger 28, thereby releasing the drop bar 25, which permits the feed gate to close completely, thereby cutting off the dribble stream. The bar 60 and the weight 64 thereon compensate for the weight of the column of material in the dribble stream which is falling into the weigh hopper at the moment the dribble stream is cut off.

Dropping of the bar 25 to its fully lowered position rocks the lever 27, causing its outer end to strike and swing upwardly the pin 40 on the weight toggle 41, thereby moving it over its dead center, and the weight of the material in the weigh hopper will swing open the hopper discharge door, as shown by the dotted lines in Fig. 2, thereby discharging the weighing from the weigh hopper. As soon as the weighing has been discharged from the weigh hopper, the hopper discharge door is closed by its counterweight, thereby swinging the weight toggle upwardly to its full line position shown in Fig. 2, and as the pin 40 assumes this position, it comes down on the outer end of the lever 27, thereby rocking this lever in a direction to swing its inner end upwardly, thereby lifting the drop bar 25 and causing upward flexing of the toggle 19, 20 and consequent unlocking of the feed gate for the succeeding weighing operation, the roller carrying end of the lever 71 being clear of the tail 70 on the weight toggle due to energizing of the solenoid 72.

However, if the material in the bin is not sufficient for the next succeeding weighing operation, the diaphragm 91 in the side of the bin will not be pressed outwardly sufficiently to move the mercury switch 97 into closed circuit condition, and consequently, the solenoid 72 will not be energized. The lever 71 will then occupy the raised position shown in full lines in Fig. 2 and in Fig. 3, and therefore will lie in the path of the tail 70 on the weight toggle 42. As the tail 70 swings from the full line to the dotted line position shown in Fig. 2 incident to opening of the hopper discharge door, its end will engage the top wall 76 and roller 77 of the lever 71 and thereby depress and pass this lever, but after the tail has passed the roller 77, the lever 71 will return to its raised position under the action of the spring 83 and will lie in the path of the tail 70, and the weight toggle will be thereby held from returning from its dotted line position to its full line position, shown in Fig. 2, so that the pin 40 on the weight toggle cannot strike the outer end of the lever 27 to unlock the feed gate to initiate feeding of another weighing to the weigh hopper. Upon accumulation of a sufficient amount of material in the bin to press the diaphragm outwardly to an extent to swing the switch 97 into closed circuit condition, the solenoid 72 will be energized, thereby lowering its roller carrying end from the path of the tail 70 on the weight toggle, thus freeing the latter for return to its raised position as shown by the full lines in Fig. 2 and permitting the operation of the machine to be resumed for the succeeding weighing.

The preferred embodiment of the locking means is shown in the drawings and has been hereinbefore described in detail, but equivalent means are contemplated, and such are intended to be included within the scope of the claim.

I claim:

In a weighing machine, the combination of a weigh hopper having a discharge door, means including a toggle connected to the door for locking the door in closed position and releasable to permit opening of the door, and movable into locked position when the door is closed, means controlled by the movement of the toggle into locked position for feeding material to the weigh hopper, means for supplying material to the feeding means, a pressure responsive switch subject to the pressure of material in the supply means, a tail connected to the toggle and movable therewith, a lever movable into and out of a position to engage the tail and thereby prevent movement of the toggle into locked position, and a solenoid connected to said switch and to said lever and operative when energized to withdraw said lever from the path of said tail and thereby permit movement of the toggle to locked position when there is a sufficient quantity of material in the supply means for a full weighing.

PHILIP B. RICHARDSON.

REFERENCES CITED

The following references are of record in the file of this patent:

UNITED STATES PATENTS

| Number | Name | Date |
|---|---|---|
| 760,485 | Richardson | May 24, 1904 |
| 962,919 | Richardson | June 28, 1910 |
| 1,230,851 | Bousfield | June 26, 1917 |
| 1,258,700 | Norris | Mar. 12, 1918 |
| 1,374,977 | Barraclough | Apr. 19, 1921 |
| 2,037,484 | Raymer | Apr. 14, 1936 |